United States Patent Office 3,393,019
Patented July 16, 1968

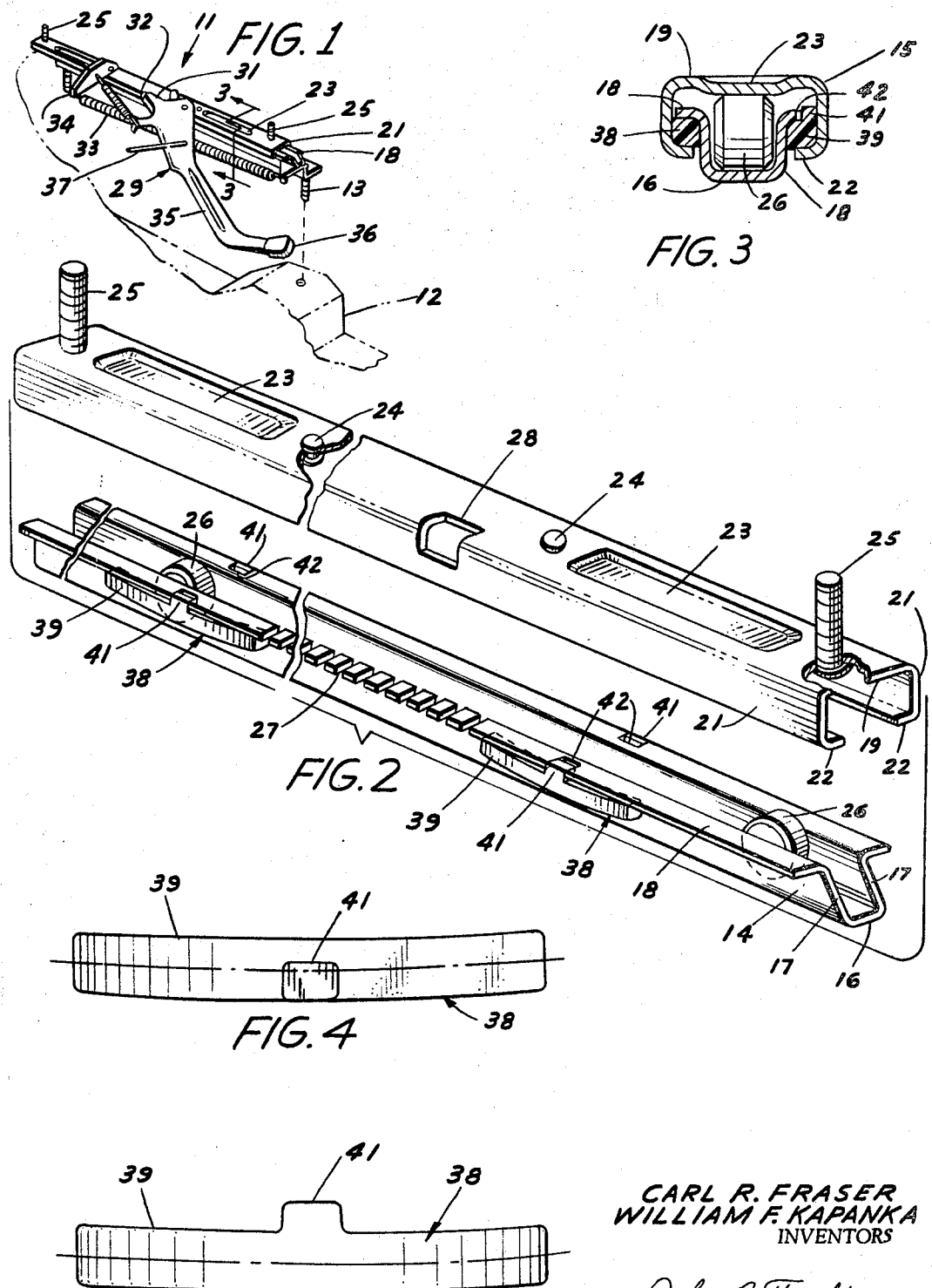

3,393,019
SEAT ADJUSTING MECHANISM
Carl R. Fraser, Livonia, and William F. Kapanka, Royal Oak, Mich., assignors to Ford Motor Company, Dearborn, Mich., a corporation of Delaware
Filed June 10, 1963, Ser. No. 286,835
3 Claims. (Cl. 308—3.6)

This invention relates to adjustable seats and more particularly to a motor vehicle seat adjusting mechanism having a slidable track unit supporting a vehicle seat for fore and aft movement.

Conventional motor vehicle seat adjusting mechanisms comprise a pair of substantially U-shaped channel track members, one invertedly encompassing the other. The track members are provided with laterally extending flanges thereon in complementary relationship to each other. A center support element, such as a roller or a ball, is interposed between the oppositely disposed base portions of the channel track members to carry the vertical load applied to the vehicle seat. On opposite sides of the center support element, balls or slidable molded slugs are fitted in the spaces defined by the pairs of complementary flanges of the channel members to provide lateral bearing between the assembled track members.

Difficulty is frequently encountered in the shaping of track members having flanged channel cross sectional shape to controlled tolerances for their entire length and in the assembly of such a pair of track members so as to maintain a uniform spaced relationship between the flanges thereof. Thus, the insertion of conventional slugs or balls intermediate the flanges will not eliminate looseness with its attendant rattling or possible binding between the track members during fore and aft adjustment of the seat.

It is the prime object of this invention to provide an improved construction and arrangement of a seat track unit for a vehicle seat adjusting mechanism in which lateral stability is maintained throughout the entire fore and aft travel of the vehicle seat.

This is accomplished by interposing novel elongated compensating bearing elements between the complementary spaced flanges of the channel members of a conventional seat track adjusting mechaisms. These bearing elements have a bowed longitudinal axis and, thus, when they are positioned between the flanges, the bearing elements are stressed to force the longitudinal axis thereof into a substantially linear, straight relationship to the flanges. The resistance to this straightening action causes the bearing elements to take up any looseness between the channel members during the entire fore and aft movement thereof.

In a preferred embodiment of this invention, the bearing elements are of a substantially uniform cross section and are bowed in a horizontal and in a vertical direction. Further, the bearing elements are preferably molded from a resilient low-friction plastic material. Although the lateral and vertical spacing between the assembled channel members may vary along the length of the overlapping track sections, the bowed elements will resiliently compensate therefor to continuously maintain sliding contact with the complementary flanges. Since the bearing elements are bowed in both a horizontal and in a vertical direction, they not only provide lateral bearing support for the seat track unit but also provide resistance in a vertical direction effective to counter any tendency of the seat track unit to swivel about the center bearing element.

Other objects and advantages of this invention will become more apparent as this description proceeds, particularly when considered in connection with the accompanying drawings, wherein:

FIGURE 1 is a perspective view of one seat track unit of an adjustable seat track mechanism incorporating the present invention;

FIGURE 2 is an exploded, enlarged view of a portion of the seat track unit of FIGURE 1;

FIGURE 3 is a sectional view taken along line 3—3 of FIGURE 1;

FIGURE 4 is an enlarged plan view of the novel bearing element utilized in the seat track unit of this invention; and FIGURE 5 is a side elevational view of the bearing element of FIGURE 4.

Referring now to the drawings, particularly to FIGURE 1, there is depicted the left-hand seat track unit 11 of a pair of seat track units which is mounted on a floor 12 of a motor vehicle by bolts 13. The pair of seat track units is located at each side of a vehicle seat (not shown) to support the latter for fore and aft movement. As the right-hand unit is substantially the same as the left-hand unit, only the left-hand unit is illustrated and is described in detail.

The seat track unit 11 (see FIGURE 2) comprises a lower channel member 14 and an upper channel member 15. The lower channel member 14 is provided with a base portion 16 and an upwardly extending leg portion 17 at each side of the base portion 16. Each leg portion 17 terminates in a laterally outwardly extending flange 18.

The upper channel member 15 comprises a base portion 19 and a downwardly extending leg portion 21 at each side thereof. Each leg portion 21 terminates in a laterally inwardly extending flange 22. To assemble the seat track unit 11, the upper channel member 15 is inverted and then positioned so as to encompass the lower channel member 14. This will place the flanges 18 of the lower channel 14 in a complementary spaced relationship to the flanges 22 of the upper channel member 15 to define in part a hollow, rectangular-shaped raceway adjacent each leg portion 17, as best seen in FIGURE 3.

The base portion 19 of the upper channel member 15 is provided with two centrally located elongated recessed portions 23 longitudinally spaced from each other as best seen in FIGURE 2. A pair of rivets 24 is provided, each rivet 24 being longitudinally spaced from the inward end of each recessed portion 23. The rivets 24 extend through the base portion 19 into the channel member 15. Bolts 25, which serve to secure the seat to the upper channel member 15, extend from inside the channel member through the base portion 19 at a point longitudinally spaced from the outward end of each elongated recessed portion 23. A pair of cylindrical rollers 26 is positioned in the lower channel member 14 to transmit the vertical load applied on the seat through the upper channel member 15 to the lower channel member 14. The rollers 26 engage the base portion 16 and the inwardly facing surface of the recessed portions 23 when the upper channel member 15 is assembled to the lower channel member 14, as best seen in FIGURE 3. The bolts 25 and the rivets 24 act as stops to control the range of movement of the upper channel member 15 over the cylindrical rollers 26.

One of the pair of flanges 18 of the lower channel member 14 has a series of laterally extending keeper notches 27. The upper channel member 15 is provided with an opening 28 at one side thereof to accommodate a conventional latching device 29 as shown in FIGURE 1.

This latching device 29 is provided to selectively hold the upper channel member 15 in juxtaposition relative to the lower channel member 14. As illustrated, the latching device 29 comprises a latch plate 31 pivotally mounted to the upper surface of the upper channel member 15. A pawl element 32 extends through the opening 28 in the upper channel member 15 to engage one of the series of keeper notches 27 in the flange 18 of the lower channel member 14.

A tension spring 33 is provided between a latch plate extension 34 and the latch plate 31 to hold the latter in a latching position. A hand lever 35 extends from the latch plate 31 to a point beneath the driver's seat and terminates in a handle portion 36 forward of the seat. Movement of the handle portion 36 causes the pawl element 32 to disengage one of the keeper notches 27 to place the latching device 29 in an unlatched position to permit movement of the seat with respect to the lower channel member 14 mounted to the floor 12 of the vehicle.

The track unit (not shown) mounted at the opposite side of the vehicle seat is provided with a similar latch plate except that the latter is adapted to be simultaneously actuated by remote control through a medium of a cable 37.

The foregoing structure is conventional and is described merely to provide an environment for an understanding of the present invention.

Referring now to FIGURES 2 and 3, it will be noted that two pairs of longitudinally spaced bearing elements 38 are disposed between the complementary spaced flanges 18 and 22 of the upper and lower channel members 15 and 14. Each pair of bearing elements 38 is positioned in each raceway disposed on opposite sides of the lower channel member 14 adjacent its respective leg portion 17.

The bearing elements 38 are depicted in greater detail in FIGURES 4 and 5. Each bearing element 38 comprises an elongated body part 39 having a substantially uniform rectangular cross section and formed with a radius in each corner. A mounting part 41 extends upwardly from the center of each elongated body part 39. The elongated body part 39 is longitudinally bowed in a laterally outward direction as best seen in FIGURE 4 and in a vertically downward direction as best seen in FIGURE 5, the direction of the bow being defined with reference to the installed relationship of the bearing elements 38. These bearing elements 38 are molded from a resilient plastic material possessing very low friction characteristics such as Teflon or acetal resin.

Each of the laterally extending flanges 18 of the lower channel member 14 is provided with two rectangular-shaped spaced notches 42 as best seen in FIGURE 2. Each notch 42 receives the upwardly extending mounting part 41 so as to secure one pair of the bearing elements 38 to each flange 18.

Upon the assembly of the upper channel member 15 to the lower channel member 14, the main elongated body part 39 will be disposed between the complementary spaced flanges 18 and 22. This results in the main body part 39 of the bearing elements 38 being stressed in a vertical and in a horizontal direction to force it toward a linear, straight relationship with the flanges 18 and 22 and the leg portions 17 and 21. The resistance to this straightening action will result in the continuous engagement of the portions of the main body part 39 that are bowed in a lateral direction with the leg portions 17 and 21 to take up any lateral play therebetween. The vertical load on the seat will be transmitted from the vapor channel member through the cylindrical rollers 26 to the lower channel member. Any pivotal movement of the upper channel member 15 about the rollers 26 will be resisted by the portions of the elongated body part 39 of the bearing elements 38 that are bowed in a vertical direction and which engage the flanges 18 and 22. Thus, maximum stability for the seat track 11 is provided for the entire range of fore and aft travel.

As the bearing elements 38 are of a one-piece construction and molded from a resilient plastic material having low friction characteristics, good sliding properties are obtained. The resiliency of the bowed bearing elements 38 will compensate for any differences in tolerances between the channel members 14 and 15 for the entire length of the raceway. Thus, any looseness and binding between the channel members 14 and 15 are prevented to achieve a rattle-free, smooth sliding seat adjusting mechanism.

It will be understood that this invention is not to be limited to the exact construction shown and described but that various changes and modifications may be made without departing from the spirit and scope of the invention as defined in the appended claims.

We claim:

1. In a seat slide mechanism, a fixed lower track having a central portion, upwardly extending side portions, and outwardly extending flanges at the upper ends of said side portions, an upper track having a central portion, downwardly extending side portions outwardly of said lower track flanges, and inwardly directed flanges below said lower track flanges, a plurality of load bearing rollers between the central portion of said trucks, and a plurality of insert members separate from said rollers and disposed between the facing side portions and flanges of said tracks, each of said insert members comprising an elongated member fabricated of material having low frictional properties, each of said insert members being bowed in its unstressed condition, the direction and extent of said bowed shape relative to the spacing between said flanges being such that said insert members will exert a constant downward force and constant oppositely directed horizontal lateral forces on said upper track.

2. A seat track unit comprising an upper and a lower channel member, each channel member having a base portion and a pair of leg portions extending generally perpendicular from each side of said base portion, said upper channel member invertedly encompassing said lower channel member with their base portions in opposed spaced relationship, a pair of rollers interposed between said base portions to maintain said channel members in a vertical spaced relationship during relative fore and aft movement therebetween and adapted to carry a vertical load applied to said seat track unit, the leg portions of each of said channel members being provided with laterally extending flanges, said laterally extending flanges and said leg portions of the upper and the lower channel members being in a complementary spaced relationship to each other to define two longitudinally extending rectangularly shaped hollow raceways, and at least two elongated slidable bearing elements disposed in each raceway, said elongated slidable bearing elements being substantially uniform in cross section and being horizontally and vertically bowed, said bearing elements being stressed in a horizontal and vertical direction to force portions of said bowed elements into a linearly straight relationship to said complimentary spaced flanges and leg portions defining the raceways, and means retaining each of said elongated bearing elements to one of said channel members against movement thereof, the resistance of each bearing element to such straightening action causing said bearing elements to take up any looseness between said channel members during fore and aft movement thereof.

3. The seat track unit as described in claim 2 and which is further characterized in that each of said elongated bearing elements comprises a plastic resilient material having a low coefficient of friction to maintain sliding engagement with said flanges and leg portions during fore and aft movement of said channel members.

References Cited

UNITED STATES PATENTS 2,757,051  7/1956  Wilmer _____ 308—3.6
3,171,698  3/1965  Campbell _____ 308—3.8
3,062,592  11/1964 Allen _____ 308—3.6

MARTIN P. SCHWADRON, *Primary Examiner.*

DAVID J. WILLIAMOWSKY, FRANK SUSKO,
*Examiners.*

L. L. JOHNSON, *Assistant Examiner.*